(12) United States Patent
Dumont et al.

(10) Patent No.: US 8,895,924 B2
(45) Date of Patent: Nov. 25, 2014

(54) INFRARED DETECTOR BASED ON SUSPENDED BOLOMETRIC MICRO-PLATES

(75) Inventors: Geoffroy Dumont, Paris (FR); Agnès Arnaud, Saint Jean le Vieux (FR); Salim Boutami, Grenoble (FR); Pierre Imperinetti, Seyssins (FR); Alexandre Mary, Chatellerault (FR); Stéphane Pocas, Grenoble (FR); Wilfried Rabaud, Moirans (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 258 days.

(21) Appl. No.: 13/296,699

(22) Filed: Nov. 15, 2011

(65) Prior Publication Data

US 2012/0153151 A1  Jun. 21, 2012

(30) Foreign Application Priority Data

Dec. 17, 2010  (FR) ...................................... 10 60713

(51) Int. Cl.
| | |
|---|---|
| *G01J 5/00* | (2006.01) |
| *H01L 31/00* | (2006.01) |
| *G01J 5/02* | (2006.01) |
| *G01J 5/08* | (2006.01) |
| *G02B 5/18* | (2006.01) |
| *G01J 5/20* | (2006.01) |
| *B82Y 20/00* | (2011.01) |

(52) U.S. Cl.
CPC .. *G01J 5/08* (2013.01); *G01J 5/024* (2013.01); *G01J 5/0806* (2013.01); *G01J 5/02* (2013.01); *G01J 5/023* (2013.01); *G02B 5/1885* (2013.01); *G02B 5/1809* (2013.01); *G01J 5/0803* (2013.01); *G01J 5/20* (2013.01); *G01J 5/0815* (2013.01); *G02B 2207/101* (2013.01); *B82Y 20/00* (2013.01)
USPC ..................................... 250/338.1; 250/338.4

(58) Field of Classification Search
CPC ....... G01J 5/0225; G01J 5/085; G01J 5/0831; G01J 5/20
USPC ............................................. 250/338.1, 338.4
See application file for complete search history.

(56) References Cited

U.S. PATENT DOCUMENTS 5,952,661 A * 9/1999 Klocek .......................... 250/351
6,094,127 A  7/2000 Yong
(Continued)

FOREIGN PATENT DOCUMENTS

EP  1 243 903 A2  9/2002
FR  2 935 809 A1  3/2010

*Primary Examiner* — David Porta
*Assistant Examiner* — Mindy Vu
(74) *Attorney, Agent, or Firm* — Burr & Brown, PLLC

(57) ABSTRACT

This bolometric array detector for detecting electromagnetic radiation in a predetermined range of infrared or terahertz wavelengths comprises a substrate and an array of bolometric micro-plates for detecting said radiation that are suspended above the substrate by support arms. It comprises a metallic membrane located above and around each micro-plate and in which openings are formed; said openings in metallic membrane are periodically located in it along at least one predetermined axis with a period equal to or less than $$\frac{\lambda}{n},$$

where λ is a wavelength in the wavelength range that is to be detected and n is the average refraction index of the medium that separates the micro-plate from metallic membrane.

17 Claims, 11 Drawing Sheets

(56) References Cited

U.S. PATENT DOCUMENTS

| | | |
|---|---|---|
| 6,753,526 B2 | 6/2004 | Vilain |
| 6,924,485 B2 | 8/2005 | Kanzaki |
| 7,294,836 B2 * | 11/2007 | Yon et al. .................. 250/338.4 |
| 7,655,909 B2 * | 2/2010 | Schimert et al. ........... 250/338.1 |
| 8,227,755 B2 * | 7/2012 | Fagan et al. ................ 250/338.4 |
| 2002/0175284 A1 | 11/2002 | Vilain |
| 2005/0161589 A1 | 7/2005 | Kim et al. |
| 2011/0216229 A1 | 9/2011 | Mary et al. |

* cited by examiner

INFRARED DETECTOR BASED ON SUSPENDED BOLOMETRIC MICRO-PLATES

BACKGROUND OF THE INVENTION

1. Field of the Invention

The invention relates to the field of infrared and terahertz bolometric detection and, more especially, the field of bolometric detection using an array of micro-plates that are suspended above a substrate.

2. Description of Related Art

It is frequently acknowledged that infrared detection, i.e. detection in the wavelength range from 0.75 µm to 1,000 µm, is a technological field that is fraught with particular problems. In fact, every object emits in the infrared spectrum as soon as its temperature exceeds 0° K. Thus, if an infrared detector is not cooled, the devices that surround the sensitive elements (substrates, connectors and wiring, packages, optics, etc.) emit significant infrared radiation which is added to the radiation originating from the scene that one is attempting to detect. This unwanted component can be very considerable and sometimes constitutes more than 99% of the total signal produced by the detection elements at a temperature of 300° K. This unwanted component is commonly referred to as "thermal noise" or "common mode noise".

Consequently and in contrast to other types of detection, especially detection in the visible spectrum, there is a need to provide structures and operating principles that are capable of effectively managing this common mode noise. To achieve this, the first high-sensitivity infrared detectors were cooled to extremely low temperatures of around a hundred degrees Kelvin or even several degree's Kelvin in order to minimize common mode noise.

Also, there are two distinct classes of infrared detectors, namely "quantum" detectors and "thermal" detectors, especially thermal bolometric detectors. It is also well known that the physical principles used by these two types of detection are fundamentally different and that each have their own problems.

In the case of quantum detectors, a semiconductor is used to produce electron-hole pairs due to the effect of photon absorption in the infrared spectrum with the charge carriers thus created being collected via electrodes which are usually combined with a PN type junction.

In contrast, in the case of bolometric detectors, an absorbent material that is selected for its ability to convert the power of the incident infrared flux into heat is used. This material, or a second material that is in contact with the first material, is also used to convert the heat produced into a variation of an electrical characteristic, generally speaking a variation in electrical resistance. This variation of the electrical characteristic is then measured.

One particular bolometric detector architecture has been devised in order to manage common mode noise, namely a detector that comprises an array of bolometric micro-plates that are suspended above a so-called "readout" substrate by means of support and thermal isolation arms.

As known in itself, this architecture is specifically provided to thermally isolate the bolometric elements from the substrate, which is the main source of common mode noise because it is located extremely close to them. This produces, firstly, a significant gain in terms of sensitivity and, secondly, this architecture also makes it possible to do away with the need for cooling down to extremely low temperatures.

Although an architecture based on suspended micro-plates has many advantages, especially the possibility of being used without being cooled down to extremely low temperatures, the presence of the support arms of the bolometric micro-plates makes it impossible to achieve a satisfactory fill factor using current fabrication techniques—the more the micro-plates are miniaturized, the worse the fill factor becomes.

Solutions have been developed in order to improve the fill factor. Nevertheless, these solutions make manufacturing processes more complex and involve higher costs. For example, Document U.S. Pat. No. 6,094,127 describes a detector with three superposed stages with, in particular, a stage that comprises an integrated circuit, a support stage and an absorption stage. The absorption stage can thus occupy the entire surface area of the detector, thereby improving its efficiency. However, in order to electrically connect the absorption stage to the support stage, an electrical interconnection element is interposed between the support and absorption stages. This electrical interconnection element consists of a conductive channel enclosed in a dielectric sheath. This results in a complex manufacturing process which poses a risk to electrical continuity from one stage of the detector to another; this continuity is, however, a crucial element for ensuring optimal operation of the detector. In addition, the presence of the electrical interconnection element that is in contact with the absorption stage can have an adverse impact on the absorption quality and sensitivity of the detector.

Also, in order to improve the efficiency of detectors and/or to reduce manufacturing costs, batch-processing fabrication methods are usually used with several arrays of micro-plates being manufactured jointly from a single silicon wafer and then being individualized as described, for instance, in Documents U.S. Pat. Nos. 6,753,526 and 6,924,485.

Given the fact that batch-processing fabrication methods are already employed in order to manufacture the arrays of micro-plates, batch-processing fabrication methods originating from the microelectronics industry are also used to produce detectors that directly include vacuum packaging for every micro-plate, as described, for instance, in the above-mentioned documents. This packaging, which is commonly referred to as integrated hermetic micro-packaging, consists of a cap produced on top of each micro-plate that sits on the substrate on each side of the micro-plate and is hermetically vacuum sealed. Performing packaging steps in batch mode makes it possible to reduce the production time and production costs of detectors compared with a single hermetically sealed package that is individually made for each array of micro-plates.

However, the space that must be left between each micro-plate in order to support the caps results in a significant reduction in the optically active surface area of the detector for any given array size and hence a direct drop in the efficiency of the detector.

By virtue of its construction, the useful surface area of a bolometric micro-plate that is suspended by support arms and dedicated to detecting infrared or terahertz radiation is limited compared with the surface area of the substrate and this reduces the detector's sensitivity.

For example, producing detectors with square micro-plates having a side dimension of 12 µm, a size that currently reflects the maximum extent of miniaturization of bolometric micro-plates, that are absorbent around $\lambda=10$ µm requires a square substrate surface area having a side dimension of at least 17 µm for each micro-plate. The useful surface area of an array of micro-plates having a side dimension of 12 µm dedicated to detection therefore accounts for no more than 50% of the total surface area of the array.

SUMMARY OF THE INVENTION

The object of the present invention is to resolve the above-mentioned problem of reduced sensitivity due to the reduced useful surface area in bolometric detectors based on suspended micro-plates.

To achieve this, the object of the invention is a bolometric array detector for detecting electromagnetic radiation in a predetermined range of infrared or terahertz wavelengths comprising:
- a substrate; and
- an array of bolometric micro-plates for detecting said radiation that are suspended above the substrate by support arms.

According to the invention:
- the detector comprises a metallic membrane placed on top and around each micro-plate and in which openings are formed; and
- the openings in the metallic membrane are periodically located in it along at least one predetermined axis with a period equal to or less than $$\frac{\lambda}{n},$$

where $\lambda$ is a wavelength in the wavelength range that is to be detected and n is the average refraction index of the medium that separates the micro-plate from the metallic membrane.

In other words, the metallic membrane causes resonance of the electromagnetic radiation which concentrates the radiation underneath the metallic membrane and hence onto the micro-plate with the latter therefore absorbing more radiation.

In the following description and as usually accepted in this field, the term "pixel", when it refers to the detection array, denotes all the hardware elements that produce an output signal relating to an image element as well as the surface dedicated to these elements.

In one embodiment of the invention, the width of the openings along the, or each, predetermined axis increases from a location on the metallic membrane positioned above a central area of the micro-plate towards the periphery of the metallic membrane.

In other words, the layout and shape of the openings cause focusing of the incident radiation on the bolometric micro-plate. Because the metallic membrane extends beyond the micro-plate, a portion of the incident radiation on that part of the metallic membrane which is not vertically aligned with the micro-plate is "redirected" towards the latter. The useful surface area dedicated to detecting radiation is therefore increased and, consequently, the overall sensitivity of the detector is optimized. What is more, this effect is obtained without the ratio of the surface of the micro-plates to the total surface of the array of micro-plates being substantially modified.

More especially, the width of the openings at said location on the membrane satisfies the equation $$0.25 < \frac{W_0}{P} < 0.75,$$

where $W_0$ is the width at said location and P is the period on the predetermined axis, with the difference in width between two adjacent openings being $$\frac{\lambda}{200 \times n} \text{ to } \frac{\lambda}{20 \times n}.$$

The width of the openings at said location is preferably substantially equal to $$\frac{P}{2}.$$

The difference in width between two adjacent openings is preferably substantially equal to $$\frac{\lambda}{100 \times n}.$$

In one embodiment of the invention, the width of the openings is constant and $$0.25 < \frac{W_0}{P} < 0.75,$$

where $W_0$ is the width of the slits and P is the period on the predetermined axis.

In one embodiment of the invention, the metallic membrane is positioned above the micro-plate at a distance of less than $$\frac{\lambda}{4 \times n};$$

this optimizes focusing onto the micro-plate.

In one embodiment of the invention, period P is substantially equal to $$\frac{\lambda}{4 \times n};$$

this maximizes absorption of the radiation by the micro-plate.

In one embodiment of the invention, the metallic membrane has a thickness that is less than $$\frac{\lambda}{4 \times n}$$

and preferably a thickness that is substantially equal to $$\frac{\lambda}{10 \times n}.$$

Absorption of the radiation by the metallic membrane is reduced in this way. In particular, such a thickness prevents radiation from being excessively trapped in the membrane and hence prevents an excessive amount of radiation being absorbed by the membrane.

In one embodiment, the metallic membrane rests on a support layer which is at least partially transparent to the wavelength that is to be detected, especially a dielectric or semiconductor layer.

In a first version of the invention, the openings in the metallic membrane are also made in the support layer.

In a second version of the invention, the support layer is solid and, together with the lateral support walls that surround the micro-plate, forms a hermetic enclosure in which the micro-plate is located. For example, the metallic membrane can be formed on the existing cover of a hermetic cap.

In one embodiment of the invention, the metallic membrane is supported by a structure that rests on the support arms of the micro-plate; this reduces the overall dimensions of the structure that supports the metallic membrane.

In one embodiment, the openings in the metallic membrane consist of parallel slits so that detection by the texturing is only sensitive to a single polarization.

Alternatively, the openings in the metallic membrane are square or circular. This way, detection by the texturing is insensitive to the polarization of the incident radiation.

In one embodiment, the metallic membrane consists of aluminum, titanium, titanium nitride, copper or tungsten.

BRIEF DESCRIPTION OF THE DRAWINGS

The present invention will be made more readily understandable by the following description which is given merely by way of example and relates to the accompanying drawings in which identical references denote identical or analogous components and in which.

DETAILED DESCRIPTION OF THE INVENTION

Figure 1:
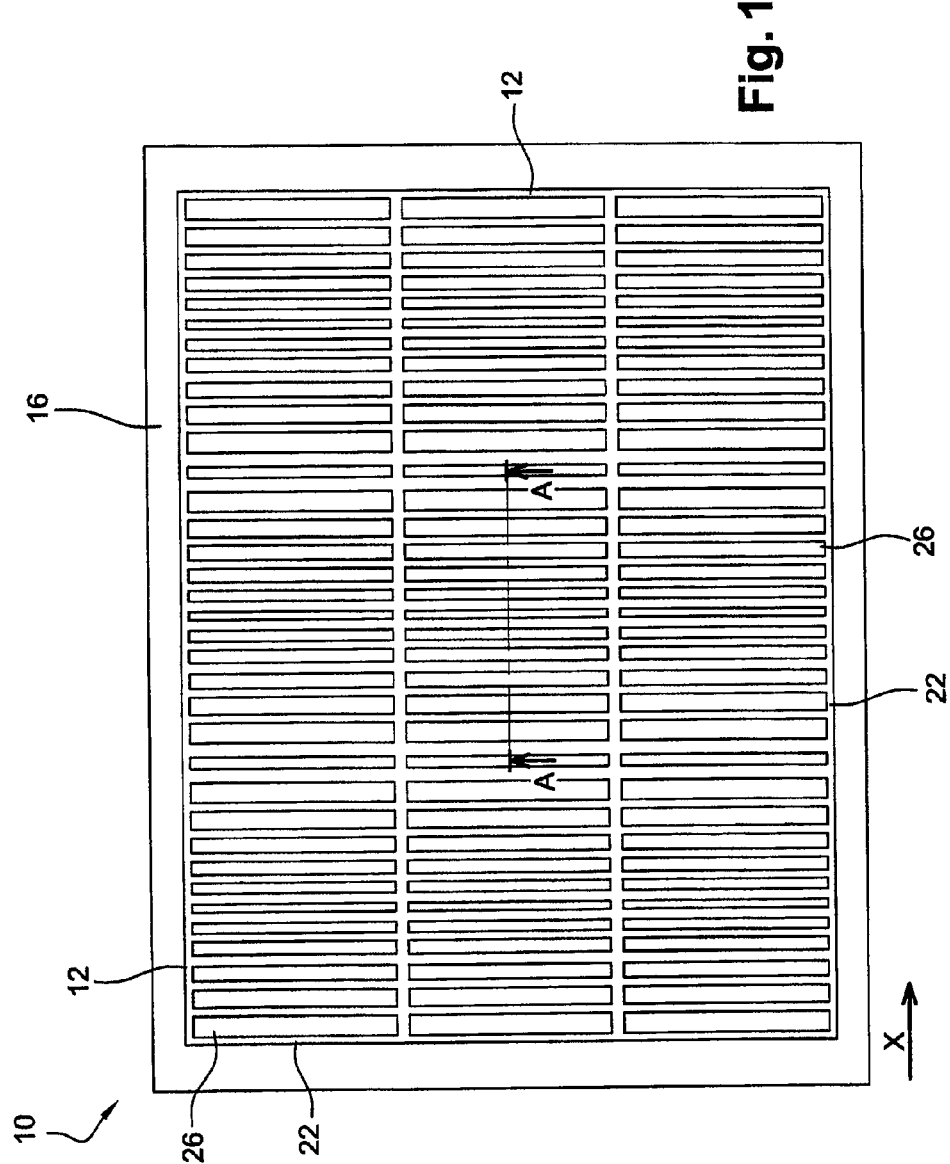
FIG. 1 is a schematic top view of a three bolometric pixel by three bolometric pixel array provided with focusing membranes according to a first embodiment of the invention.
Figure 2:
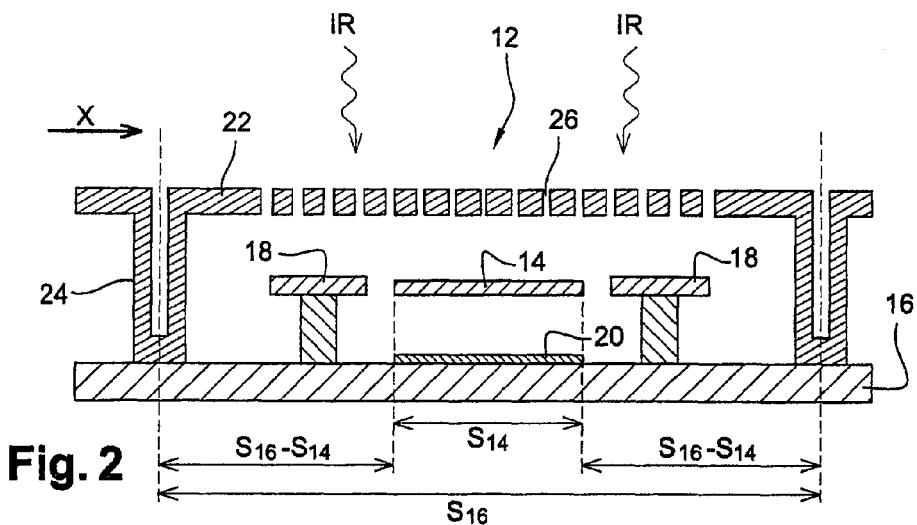
FIG. 2 is a schematic cross-sectional view of the array in FIG. 1 along line A-A.

FIGS. 1 and 2 show, by way of example, a bolometric detector array 10 comprising three pixels by three pixels in accordance with a first embodiment of the invention.

Each pixel 12 comprises a bolometric micro-plate 14, suspended above a substrate 16 by support and thermal isolation arms 18, which makes it possible to detect incident electromagnetic radiation IR in an infrared wavelength range from 0.75 μm to 1,000 μm and/or in a terahertz wavelength range from 1 mm to 3 mm.

As is known in itself, micro-plate 14 warms up due to the effect of the incident radiation IR and its electrical resistance varies as a function of the increase in its temperature. The same material can be used to implement both these functions, TiN for instance is suitable for detecting wavelengths in the mid infrared range.

The support and thermal isolation arms 18 consist mostly of a material with a low thermal conductance which contains an electrical conductor element that makes it possible to subject micro-plate 14 to a bias voltage and/or bias current in order to measure its electrical resistance. Arms 18 are electrically connected to a readout circuit provided in substrate 16 which controls the biasing of micro-plate 14.

Each pixel 12 also comprises a flat reflector 20 formed by a layer of metal deposited on substrate 16 and located underneath micro-plate 14. The function of reflector 20 is to reflect that portion of radiation which has passed through micro-plate 14 without being absorbed, thus making it possible for the radiation to pass through the micro-plate at least twice or even obtain resonance if the distance between micro-plate 14 and reflector 20 is adjusted to form a quarter-wave space for instance.

In the context of the invention, the structure and the operation of bolometric micro-plates 14 are relatively unimportant, any type of micro-plate can be envisaged, for example the micro-plate described in Document FR 2 752 299. The important fact to grasp is that the invention applies to any bolometric array in which the surface area of the micro-plates is reduced relative to the surface area of the pixels.

Advantageously, each pixel 12 also comprises a metallic membrane 22 that is suspended above micro-plate 14 by a support structure 24 which is formed on substrate 16 halfway between pixel 12 and the pixels that are adjacent to pixel 12. Metallic membrane 22 consists, for example, of aluminum, titanium, titanium nitride, copper or tungsten—these are metals that make it easy to manufacture membrane 22.

In the example shown, micro-plate 14 and membrane 22 are rectangular and centered on each other.

Support structure 24, in the form of lateral walls for instance, surrounds micro-plate 14, the support arms and surface $S_{16}$ of substrate 16 dedicated to pixel 12, so that metallic membrane 22 covers substantially the entire surface of pixel 12. In particular, metallic membrane 22 substantially covers the entire surface $S_{16}$-$S_{14}$ of pixel 12 that is not covered by micro-plate 14.

Membrane 22 also comprises a set of straight parallel slits having a rectangular cross-section that are made over the entire width of membrane 22, with slits 26 being arranged in order to focus incident radiation IR on membrane 22 onto micro-plate 14, especially incident radiation on that portion of membrane 22 which is not located above micro-plate 14.

Figure 3:
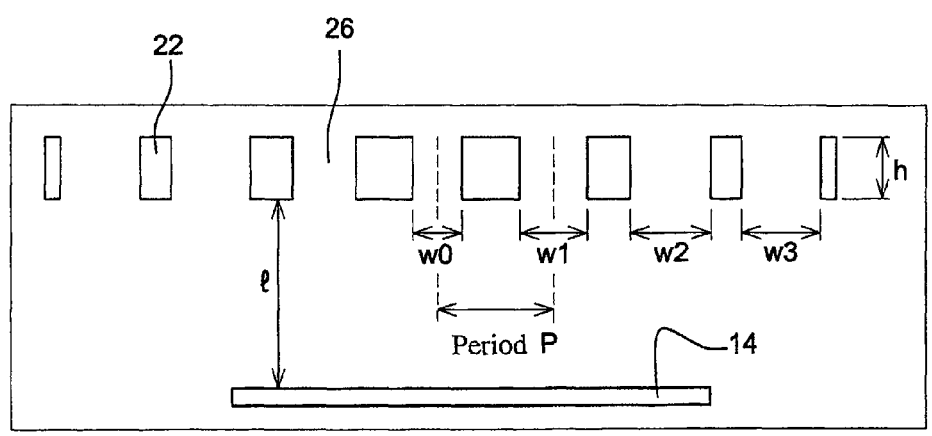
FIG. 3 is a simplified schematic cross-sectional view of a pixel of the array in FIG. 1.

In FIG. 3, slits 26 are regularly placed in direction X which is perpendicular to them, with the median axes of slits 26 being positioned at a constant period P. This period, selected as a function of wavelength 2 that is to be focused onto micro-plate 14 is less than $$\frac{\lambda}{n},$$

where n is the refraction index of the medium that separates micro-plate 14 from metallic membrane 22, this is usually air at a reduced pressure. Period P is preferably substantially equal to $$\frac{\lambda}{4 \times n}$$

because this value maximizes the absorption of radiation by micro-plate 14.

Also, the width W of slits 26 in direction X increases from the center of membrane 22, i.e. in the example shown, from the location on membrane 22 that is vertically above the center of micro-plate 14 in the direction of the periphery of membrane 22, so as to focus incident radiation on membrane 22 in a central space underneath membrane 22; this makes it possible to increase the quantity of radiation that is "seen" by micro-plate 14 and therefore absorbed by the latter.

Advantageously, the difference ($W_{n+1} - W_n$) in the widths $W_n$ and $W_{n+1}$ of two adjacent slits is $$\frac{\lambda}{200 \times n} \text{ to } \frac{\lambda}{20 \times n}.$$

This difference is preferably substantially equal to $$\frac{\lambda}{100 \times n}$$

because this value maximizes the absorption of radiation by micro-plate 14.

Advantageously, this increase in width as one moves away from the center of membrane 22 is constant and the width of the slits therefore increases linearly. It is nevertheless possible to provide slits that have a width that increases non-linearly.

Also advantageously, the width $W_0$ of the central slit satisfies the equation $$0.25 < \frac{W_0}{P} < 0.75$$

and is preferably substantially equal to $$\frac{P}{2}.$$

With a period P equal to $$\frac{\lambda}{4 \times n},$$

width $W_0$ therefore equals $$\frac{\lambda}{8 \times n},$$

i.e. is very small. Although the width of slits 26 increases from the center towards the periphery of membrane 22 it remains small given the value of the incremental increase in width ($W_{n+1} - W_n$).

Also advantageously, the thickness h of metallic membrane 22 is less than $$\frac{\lambda}{4 \times n}$$

and preferably substantially equal to $$\frac{\lambda}{10 \times n}.$$

Such a small thickness prevents radiation from being excessively trapped in membrane 22 and hence prevents an excessive amount of radiation being absorbed by the membrane.

Also advantageously, metallic membrane 22 is positioned above micro-plate 14 at a distance l that is less than $$\frac{\lambda}{4 \times n},$$

with this distance possibly being zero and membrane 22 resting on micro-plate 14. With a distance l that is less than $$\frac{\lambda}{4 \times n},$$

evanescent coupling between slits 26 of membrane 22 and micro-plate 14 is observed, this significantly increases the absorption of radiation at wavelength λ.

Figure 4:
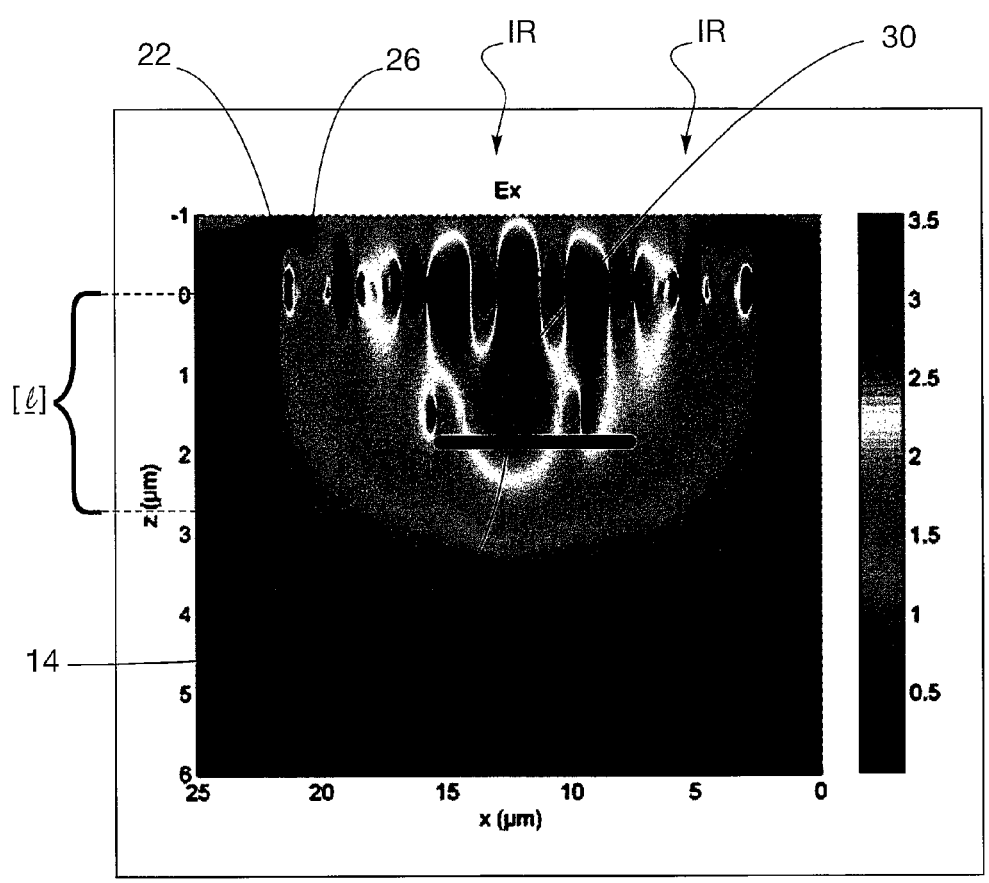
FIG. 4 maps the intensity of an electromagnetic field in the presence of a focusing membrane in accordance with the invention in a plane that is normal to the membrane.

FIG. 4 maps the intensity of the electromagnetic field in the presence of a focusing membrane 22, in a plane that is perpendicular to the membrane, in direction X, said membrane 22 being illuminated by infrared radiation in the 3-15 μm range. The x-axis represents said direction X and its origin is the right-hand edge of membrane 22, the y-axis represents the direction that is perpendicular to direction X in said plane and its origin is the lower face of membrane 22:

membrane 22 is tuned to a wavelength of 12.5 μm:
period P is 2.8 μm,
the width $W_0$ of the central slit equals 1.4 μm,
the width increment ($W_{n+1} - W_n$) between two adjacent slits equals 100 nm, and
the thickness h of membrane 22 equals 200 nm;
the width of a pixel in direction X is 25 μm, and
the width of micro-plate 14 in this same direction is 7 μm.
Membrane 22 and micro-plate 14 are located in the air. Here, micro-plate 14 is shown, by way of example, at located distance l (equals 2 μm) from membrane 22, with the preferred interval [l] for these distances also being shown.

As is clearly apparent in FIG. 4, it is evident that the intensity of the infrared electromagnetic field is intensified underneath membrane 22, with maximum intensification occurring in a central area 30 underneath membrane 22.

Figure 5:
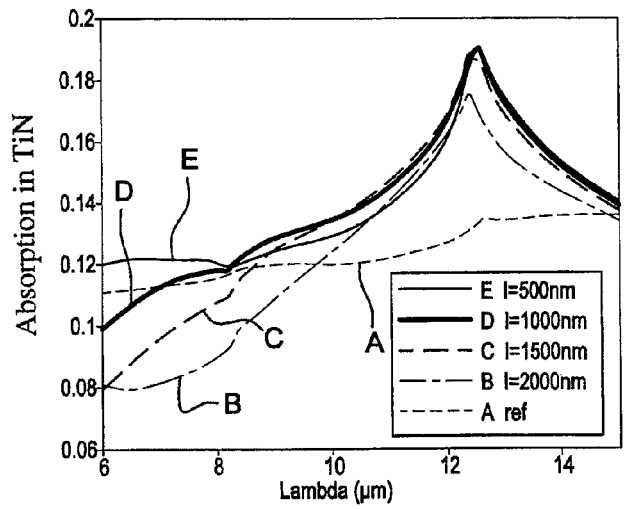
FIG. 5 is a curve that plots absorption in a micro-plate made of TiN for various distances between the micro-plate and the focusing membrane.

FIG. 5 is a curve that plots absorption in micro-plate 14 made of TiN in the 6-15 μm range for various distances l in the context of the numerical examples in FIG. 4. The absorption of micro-plate 14 when there is no focusing membrane 22 is illustrated by curve "A" by way of comparison.

Curve "B" shows the absorption of micro-plate 14 when the distance l from membrane 22 equals 2.5 μm, curve "C" shows this absorption when distance l equals 1.5 μm, curve "D" shows absorption when distance l equals 1 µm and curve "E" shows absorption when distance l equals 0.5 µm.

It is apparent that absorption is substantially augmented for a wide range of wavelengths with this increase being around 50% of the maximum absorption peak. It should also be noted that the absorption peak between 10 µm and 15 µm is only very slightly modified with values of l that are less than 1 µm, i.e. values less than $$\frac{\lambda}{10 \times n}.$$

An embodiment in which straight parallel slits are made in membrane 22 is described above; this enables the focusing provided by membrane 22 to be sensitive to polarization. In particular, light that is polarized at right angles to the slits in the plane of membrane 22 is focused.

However, there may be a requirement to apply focusing to light that is polarized in different ways.

Figure 6:
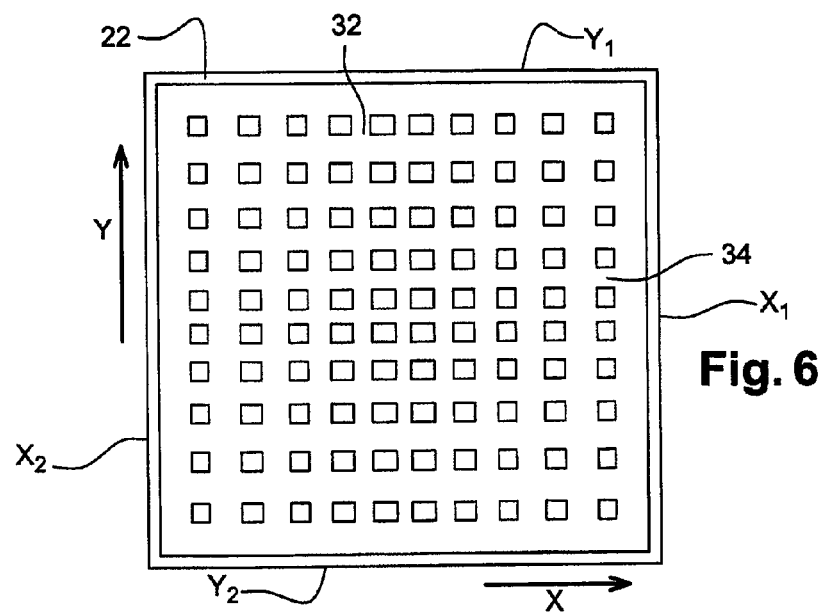
FIG. 6 is a top view of another embodiment of the focusing membrane according to the invention.

Alternatively, the openings in focusing membrane 22 are regularly arranged in several different directions in the plane of the membrane. As shown, for example, in FIG. 6, two grids of cross slits 32, 34 are regularly arranged along axis X and axis Y respectively, with the grids having an identical width increment. Such a layout enables identical detection of light that is polarized in the direction of the X and Y axes. Obviously, other configurations are possible depending on the sought-after application. Firstly, the period on the X axis can be different from the period on the Y axis. Similarly, it is possible to provide a width increment on the X axis that is different to that on the Y axis. Likewise, it is possible to provide X and Y axes that are not perpendicular and/or slits that have one or more additional axes. Another alternative is to provide, instead of grids of slits, rectangular, square, circular or other shape openings in the thickness of the focusing membrane. Here too, it is possible to define axes in the plane of the membrane along which these openings are regularly spaced with the widths along said axes increasing as one gets closer to the edges of the membrane.

Several embodiments and their associated manufacturing method are described below with regard to the suspension structure of the focusing membrane.

FIGS. 7 to 12 are schematic cross-sectional views showing a method for manufacturing a first embodiment of the suspension structure.

Figure 7:
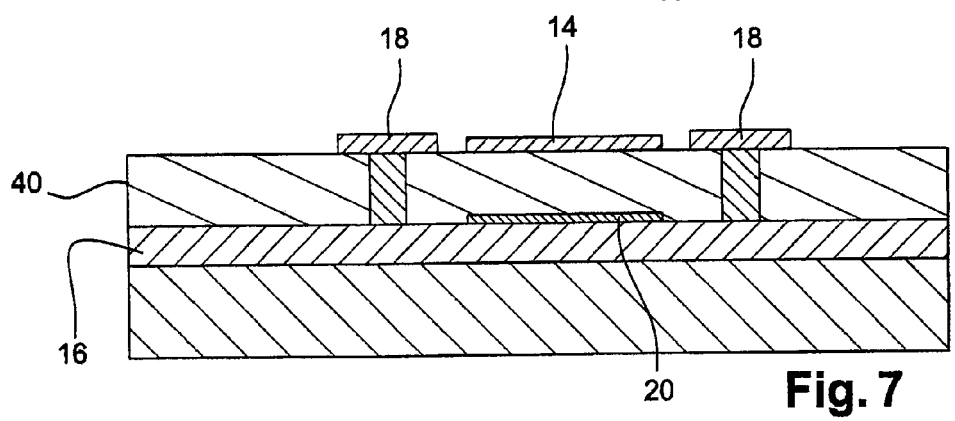
FIGS. 7 to 12 are schematic cross-sectional views showing a method for manufacturing a focusing membrane support structure in accordance with a first embodiment.

The method starts by fabricating, on substrate 16, the array of micro-plates 14, support arms 18 and reflectors 20. This manufacturing step is conventional and, as is known in itself, micro-plates 14 are produced on a sacrificial layer 40 deposited on substrate 16 (FIG. 7).

Figure 8:
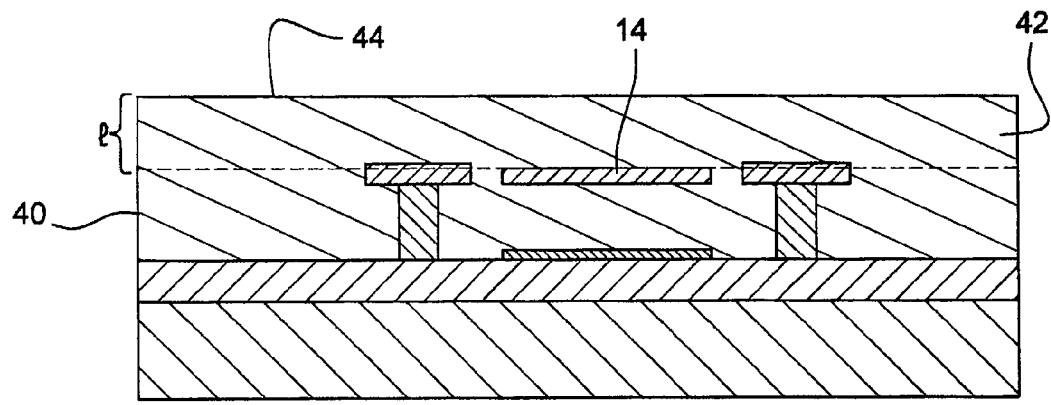

Once micro-plates 14 have been formed, the method continues by depositing a second sacrificial layer 42 on first sacrificial layer 40, micro-plates 14 and support arms 18. The thickness of second layer 42 equals the desired distance l between focusing membrane 22 and micro-plate 14 (FIG. 8). Second layer 42 is deposited, for example, by using a spin coating technique and advantageously consists of the same material as first layer 40, especially a polyimide, a polymer, for instance a benzocyclobutene (BCB) based polymer, a pre-baked photosensitive resin or other resin. Together, first and second layers 40, 42 form a composite sacrificial layer 44.

Figure 9:
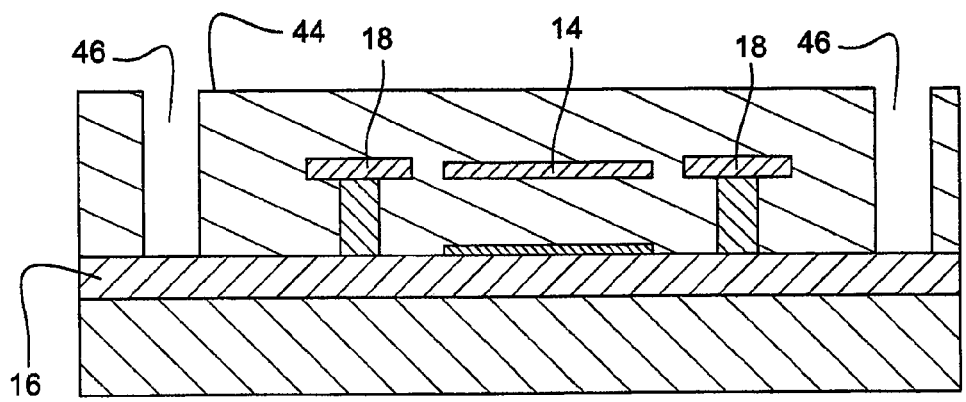

Sacrificial layer 44 is then etched down to substrate 16 in order to expose a cut 46 all the way round each micro-plate 14 and its support arms 18 in the desired location for the support structure of the focusing membrane, for example a cut formed at the boundary of the surface of substrate 16 that is used for micro-plate 14 (FIG. 9). Cuts 46 are advantageously made by dry Reactive Ion Etching (RIE) which allows highly anisotropic etching or even by chemical etching in oxygen.

Figure 10:
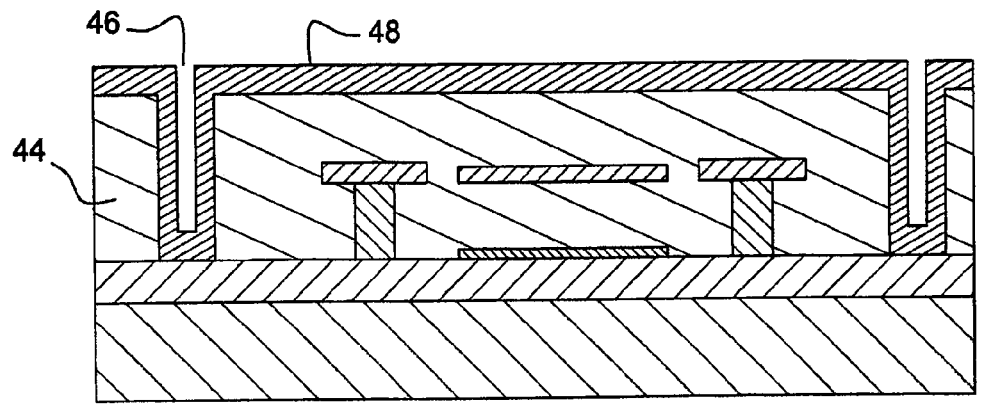

Metal is then deposited in a solid sheet so that sacrificial layer 44 and cuts 46 are covered by a focusing layer 48 (FIG. 10). This metal is preferably deposited using Chemical Vapor Deposition (CVD) which ensures good conformity of the metal deposited on the flanks of cuts 46. Metal layer 48 which constitutes the focusing membranes and their support structures in this embodiment is made of aluminum, titanium, titanium nitride, copper or tungsten.

Figure 11:
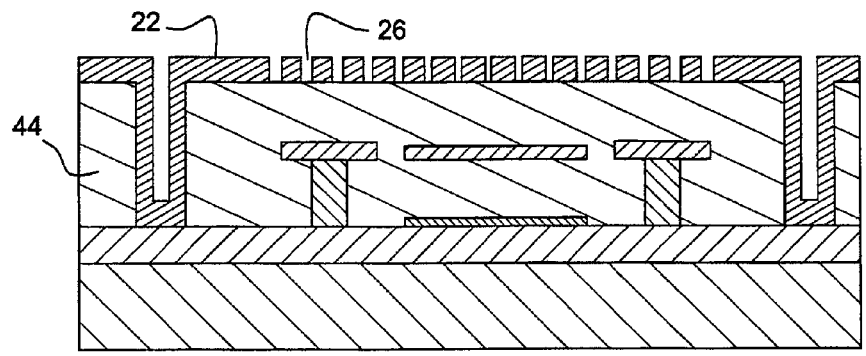

Lithography and etching, e.g. dry RIE type etching, are then used to make openings 26 in metal layer 48 in order to form focusing membrane 22 of the invention (FIG. 11). Lithography and etching are used here in a way that is known in itself.

Figure 12:
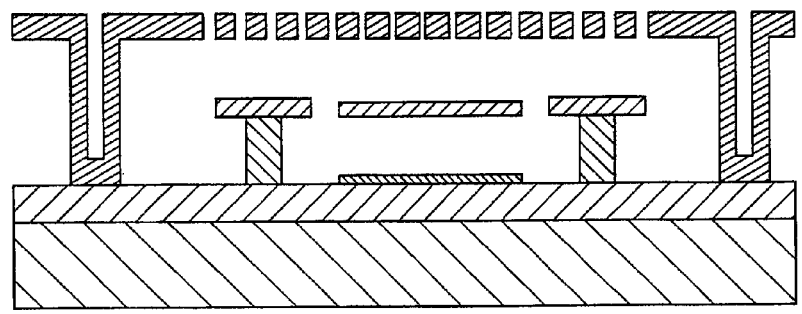

Finally, sacrificial layer 44 is removed, for example by using an oxygen or ozone plasma (FIG. 12).

This embodiment is advantageous insofar as the number of manufacturing steps involved is minimal.

However, depending on the material chosen for substrate 16, the adhesion of the metal layers on substrate 16, and hence the adhesion of support structure 24 on substrate 16, and/or the deposition conformity of some metals, can be problematic, especially in terms of the mechanical fragility of structure 24.

A second embodiment of the support structure and its manufacturing process are described below in relation to the schematic, cross-sectional views in FIGS. 13 to 15.

Figure 13:
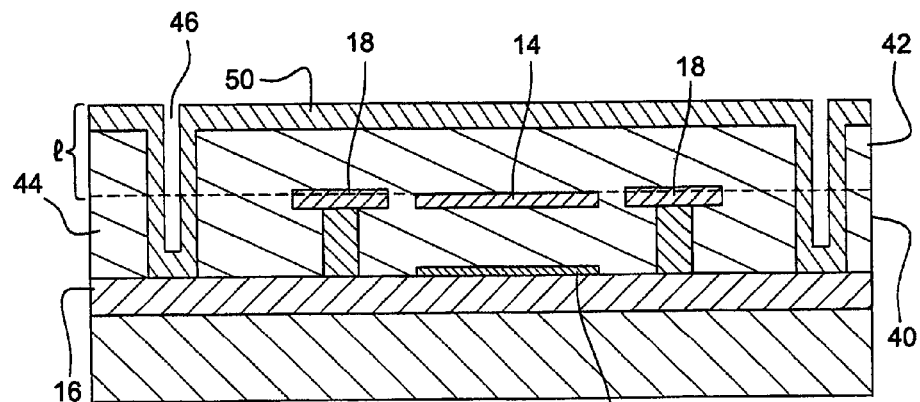
FIGS. 13 to 15 are schematic cross-sectional views showing a method for manufacturing a focusing membrane support structure in accordance with a second embodiment.

This method starts with the same steps as those described in relation to FIGS. 7 to 9 and then continues by depositing a solid sheet of a semiconductor or dielectric material so that sacrificial layer 44 and cuts 46 are covered by a layer 50 of said material (FIG. 13). However, unlike the previous embodiment, the thickness of the second sacrificial layer 42 deposited on micro-plate 14 takes into account the thickness of layer 50, with the sum of the thicknesses of layer 42 and layer 50 equaling the desired distance l between focusing membrane 22 and micro-plate 14.

The material of layer 50 is advantageously chosen so that it is compatible with the material of substrate 16, especially in terms of adhesion and deposition conformity.

The material of layer 50 is also chosen so that it is relatively non-absorbent in the wavelength range that is to be detected. For example, for the infrared wavelength range, the material of layer 50 is germanium, amorphous silicon or Si—Ge and, for the terahertz wavelength range, the material of layer 50 is a silica SiOx, SiON or SiN.

Figure 14:
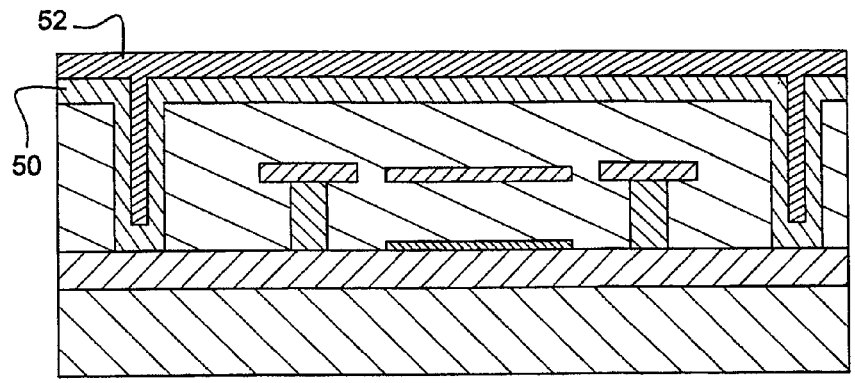

Once layer 50 has been deposited, advantageously by CVD which ensures good deposition conformity of the material on the flanks of cuts 46, the method continues by depositing a solid sheet of metallic material that constitutes the focusing membrane, for example one of those described above, so as to form a metal layer 52 that covers layer 50, including in cuts 46 (FIG. 14). Chemical Vapor Deposition (CVD) or Physical Vapor Deposition (PVD) is used for example.

Figure 15:
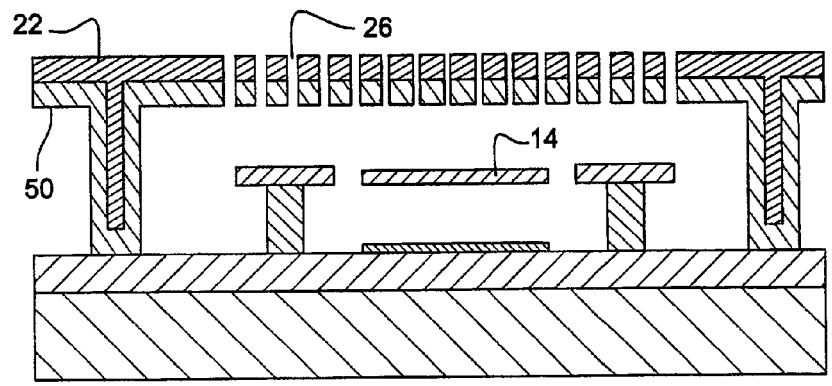

Lithography and etching, for instance dry RIE type etching, are then performed to make openings 26 in metal layer 52 and dielectric layer or semiconductor layer 50, in order to form focusing membrane 22 of the invention and sacrificial layer 44 is removed, for instance by using an oxygen or ozone plasma (FIG. 15).

Note that, unlike the preceding embodiments, a layer of material is present between membrane 22 and micro-plate 14. Nevertheless, given the low periodicity, layer 50 behaves like a layer that has a homogeneous average refraction index and does not substantially interfere with the light.

The equations stated above which are a function of the refraction index of the medium that separates focusing membrane 22 from micro-plate 14 therefore remain valid. In the case of embodiments in which dielectric and/or semiconductor layers are used, the refraction index that is taken into consideration in these equations is then the average refraction index of the medium that separates membrane 22 from micro-plate 14.

A third embodiment of the support structure and the method for manufacturing it are described below in relation to the schematic, cross-sectional views in FIGS. 16 to 19; this third embodiment makes it possible to manufacture a focusing membrane and a hermetic cap for each micro-plate at the same time.

Figure 16:
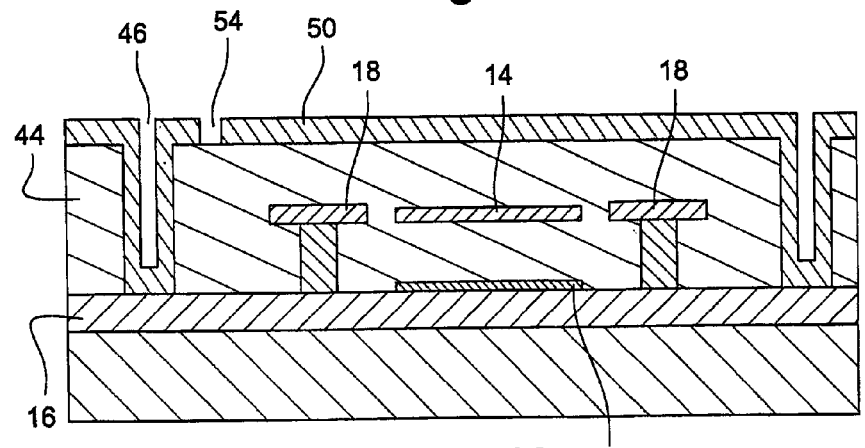
FIGS. 16 to 19 are schematic cross-sectional views showing a method for manufacturing a focusing membrane support structure in accordance with a third embodiment.
Figure 17:
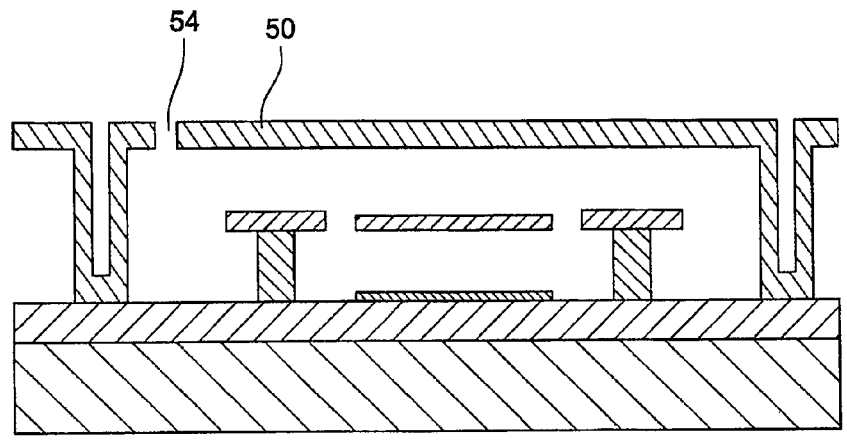

This method starts with the same steps as those described in relation to FIG. 13 and continues by lithography and etching, for instance dry RIE type etching, in order to make a release vent 54 in layer 50 as far as sacrificial layer 44 (FIG. 16). Sacrificial layer 44 is then removed, for example by using an oxygen or ozone plasma applied through release vent 54 (FIG. 17).

Figure 18:
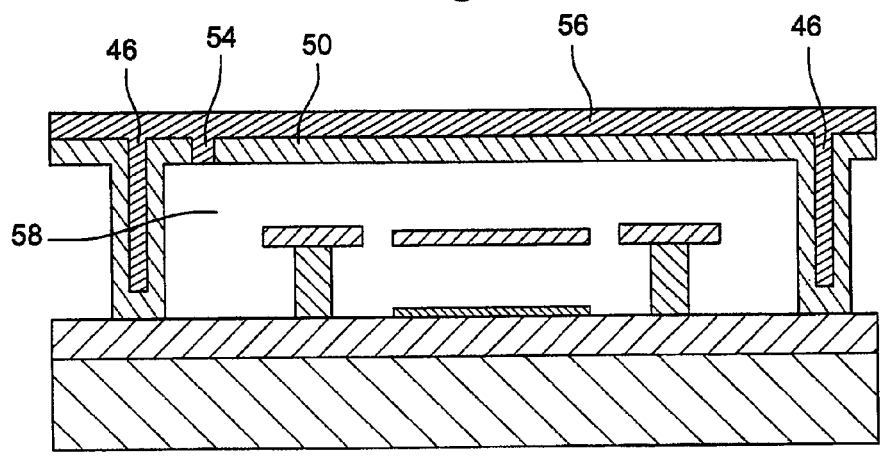

The method continues by depositing a solid sheet of metallic material that constitutes the focusing membrane, for example one of those described above, so as to form a metal layer 56 that covers layer 50, including in cuts 46 and release vent 54 (FIG. 18). A hermetic space 60 is thus obtained around micro-plate 14 and support arms 18. Metal layer 56 is deposited by sputtering, CVD or evaporation in order to obtain a hard vacuum in space 60. This produces integrated hermetic packaging for micro-plate 14.

Figure 19:
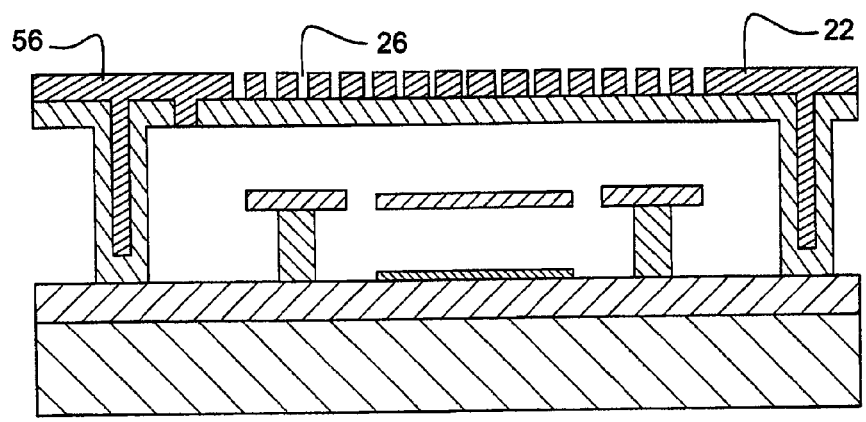
Figure 20:
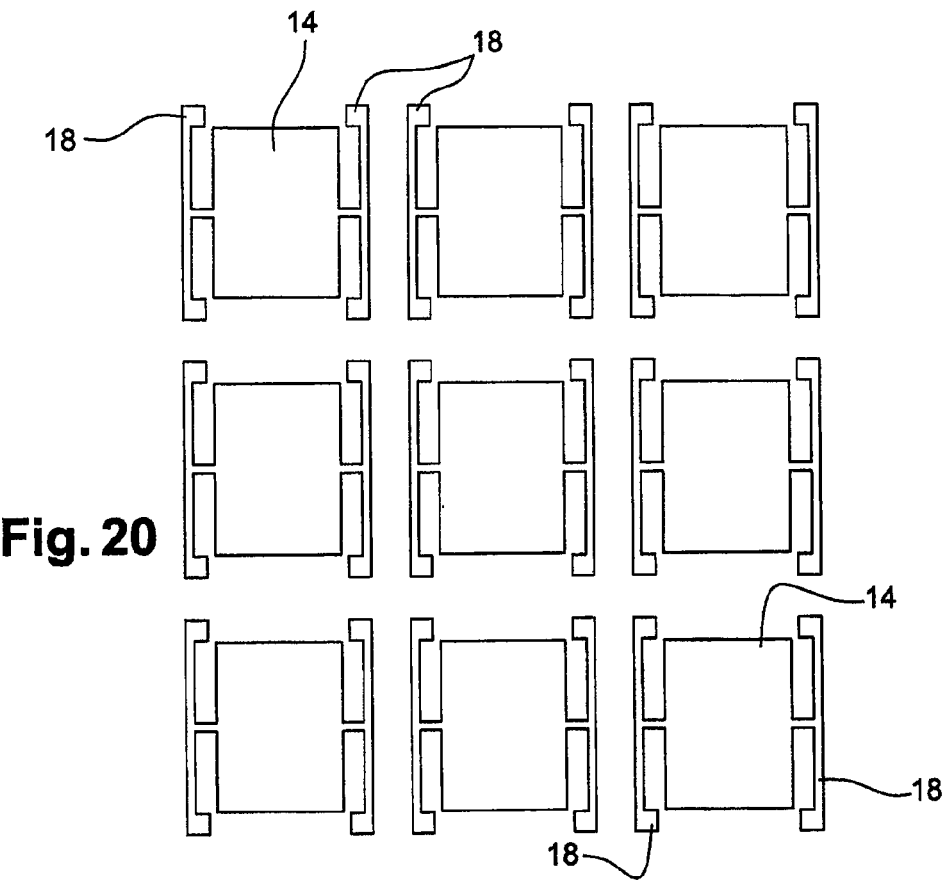
FIGS. 20 and 21 are top views of an array of micro-plates with individual support arms and an array of micro-plates with common support arms respectively.

Lithography and etching, e.g. dry RIE type etching, are then used to make openings 26 in metal layer 56 in order to form focusing membrane 22 of the invention (FIG. 19). Applications of the present invention based on bolometric micro-plates that are suspended by individual support arms, i.e. arms that only suspend one micro-plate at a time, are described above. A top view of an example of an array of micro-plates 14 with individual support arms 18 is shown in FIG. 20.

Figure 21:
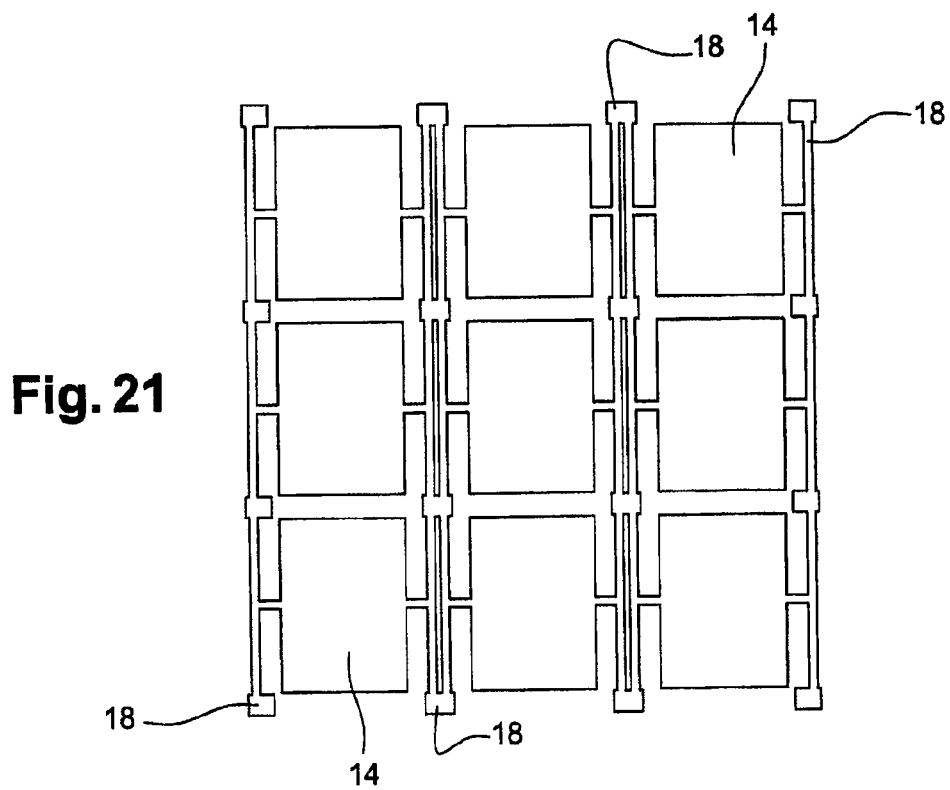

There are, however, architectures in which one support arm jointly suspends two adjacent micro-plates, as shown in FIG. 21 which is a top view of an array of micro-plates with common support arms 18.

Note that, from the point of view of the substrate space needed in order to realize one micro-plate, it is irrelevant whether the support arms are individual or common and these architectures both result in a low fill factor.

On the other hand, with common support arms, it is not possible to realize one support structure for one focusing membrane formed by a continuous lateral wall around the micro-plate and its support arms, unlike the architecture with individual support arms in which there is a gap all around every micro-plate and its arms. In addition, a support arm has two essential functions, namely mechanically suspending the micro-plate and thermally isolating it. Thus, the support structure of a focusing membrane must at least be in thermal contact with the support arms. It is therefore readily apparent that manufacturing this structure in an architecture based on common support arms is complex if there is a requirement to make the structure rest on the substrate.

A simple method for manufacturing a focusing membrane in an architecture based on common support arms is described below in relation to the schematic, cross-sectional views in FIGS. 22 to 27.

Figure 22:
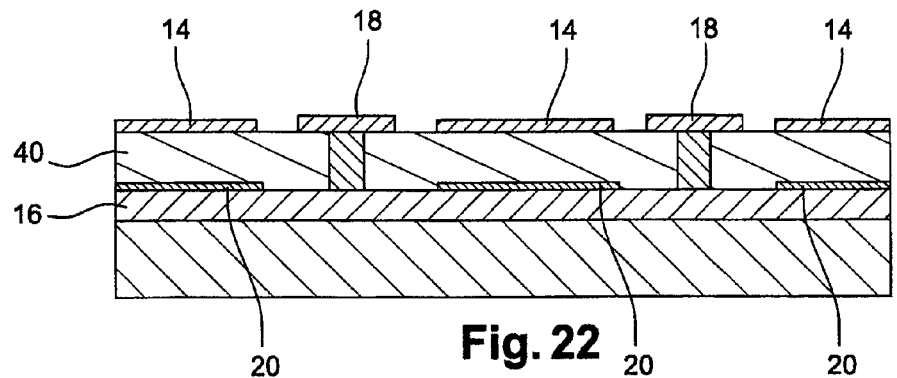
FIGS. 22 to 27 are schematic cross-sectional views showing a method for manufacturing a focusing membrane support structure in accordance with a fourth embodiment.

The method starts by fabricating, on substrate 16, the array of micro-plates 14, common support arms 18 and reflectors 20. This manufacturing step is conventional and, as is known in itself, micro-plates 14 are produced on a sacrificial layer 40 deposited on substrate 16 (FIG. 22).

Figure 23:
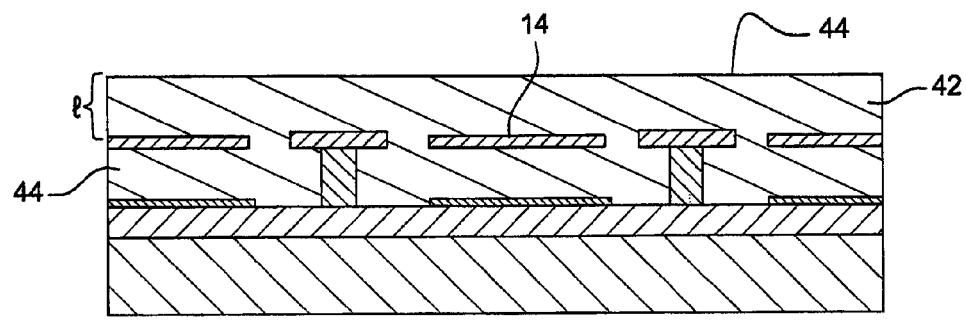

Once micro-plates 14 have been formed, the method continues by depositing a second sacrificial layer 42 on first sacrificial layer 40, micro-plates 14 and common support arms 18. The thickness of second layer 42 equals the desired distance l between focusing membrane 22 and micro-plate 14 (FIG. 23). Second layer 42 is deposited, for example, by using a spin coating technique and advantageously consists of the same material as first layer 40, especially a polyimide, a polymer, for instance a benzocyclobutene (BCB) based polymer, a pre-baked photosensitive resin or other resin. Together, first and second layers 40, 42 form a composite sacrificial layer 44.

Figure 24:
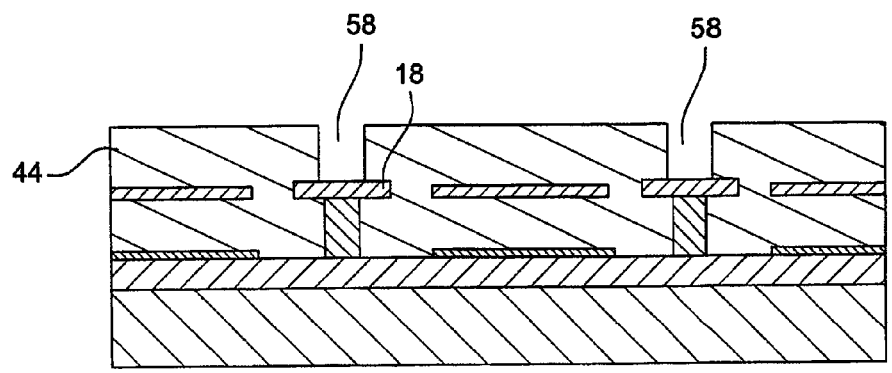

A step to etch sacrificial layer 44 is then performed in order to form cuts 58 that release at least a portion of common support arms 18 and, more precisely, a portion or the totality of the vertical structure of arms 18 which are mechanically attached to substrate 16 (FIG. 24). Dry RIE type etching which allows highly anisotropic etching is used for example.

Figure 25:
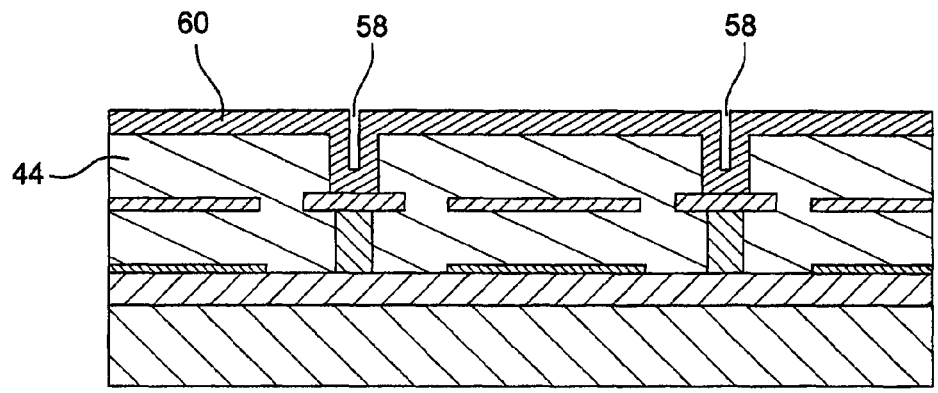

Metal, for instance one of those described above, is then deposited in a solid sheet so that sacrificial layer 44 and cuts 58 are covered by a metal layer 60 (FIG. 25).

Figure 26:
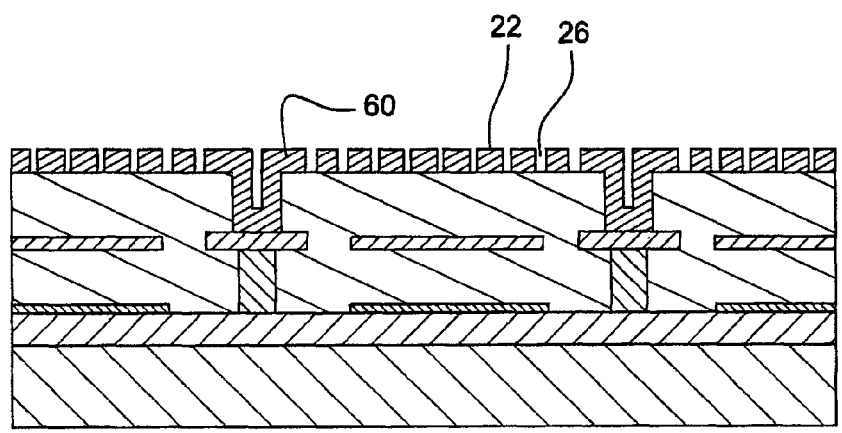
Figure 27:
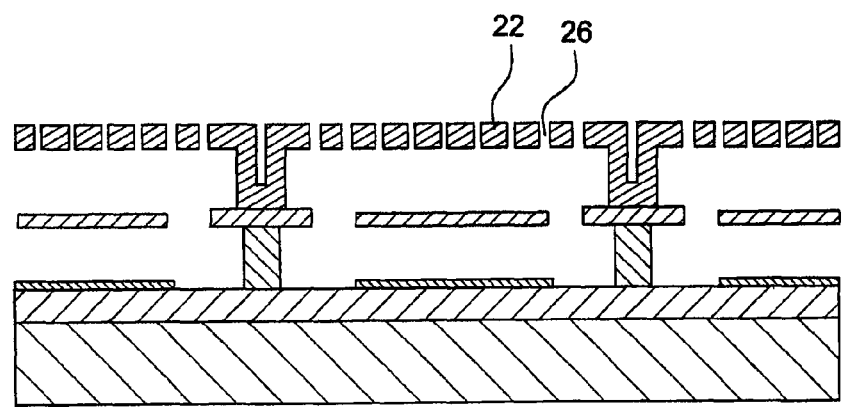

Lithography and etching, e.g. dry RIE type etching, are then used to make openings 26 in metal layer 60 in order to form focusing membrane 22 of the invention (FIG. 26). Finally, sacrificial layer 44 is removed, for example by using an oxygen or ozone plasma (FIG. 27).

Although only the focusing membrane is produced in the embodiment described, it is also possible to provide a dielectric and/or semiconductor layer in a manner similar to the embodiments described in relation to the embodiments in FIGS. 13 to 19. Advantageously, the additional layer will consist of a thermally insulating material in order to interfere with the thermal isolation of the common support arms as little as possible.

Similarly, if the application so demands, it is also possible to provide focusing membrane support structures that rest on the individual support arms.

The invention can be used advantageously in the context of integrated hermetic micro-packaging: a focusing membrane, located in the upper plane of the micro-packaging, thus makes it possible to compensate for the loss of the optically active surface area caused by the flanks of the micro-packaging. This also has the benefit of a lower production cost thanks to producing the packaging in a batch process while minimizing the drop in the efficiency of the detector that is necessarily caused by this type of packaging.

The invention claimed is:

1. A bolometric array detector for detecting electromagnetic radiation in a predetermined range of infrared or terahertz wavelengths comprising a substrate and an array of bolometric micro-plates for detecting said radiation, said micro-plates being suspended above the substrate by means of support arms, wherein said detector comprises a metallic layer having a portion forming a membrane placed on top and around each micro-plate and in which openings are formed;

wherein the openings formed in the metallic membrane are periodically located in said membrane along at least one predetermined axis with a period equal to or less than $$\frac{\lambda}{n},$$

where $\lambda$ is a wavelength in the wavelength range of the electromagnetic radiation to be detected and n is the average refraction index of a medium that separates micro-plate from the metallic membrane; and wherein the metallic layer extends downward all the way around said micro-plate.

2. The bolometric array detector as claimed in claim 1, wherein the width of the openings along the, or each, predetermined axis increases from a location on the metallic membrane positioned above a central area of micro-plate towards the periphery of said metallic membrane.

3. The bolometric array detector as claimed in claim 2, wherein the width of the openings at said location on the membrane satisfies the equation $$0.25 < \frac{W_0}{P} < 0.75,$$

where $W_0$ is the width at said location and P is the period along the predetermined axis, with the difference in width between two adjacent openings being $$\frac{\lambda}{200 \times n} \text{ to } \frac{\lambda}{20 \times n}.$$

4. The bolometric array detector as claimed in claim 1, wherein the width of the openings is constant and between $$0.25 < \frac{W_0}{P} < 0.75,$$

where $W_0$ is the width of the slits and P is the period on the predetermined axis.

5. The bolometric array detector as claimed in claim 1, wherein the metallic membrane is located above the micro-plate at a distance of less than $$\frac{\lambda}{4 \times n}.$$

6. The bolometric array detector as claimed in claim 1, wherein the period is substantially equal to $$\frac{\lambda}{4 \times n}.$$

7. The bolometric array detector as claimed in claim 1, wherein the metallic membrane has a thickness of less than $$\frac{\lambda}{4 \times n}$$

and preferably a thickness that is substantially equal to $$\frac{\lambda}{10 \times n}.$$

8. The bolometric array detector as claimed in claim 1, wherein the metallic membrane rests on a support layer which is at least partially transparent to the wavelength of the electromagnetic radiation to be detected, especially a dielectric or semiconductor layer.

9. The bolometric array detector as claimed in claim 8, wherein the openings in the metallic membrane are also realized in the support layer.

10. The bolometric array detector as claimed in claim 8, wherein the support layer is solid and forms, together with lateral support walls that surround the micro-plate, a hermetic enclosure in which said micro-plate is positioned.

11. The bolometric array detector as claimed in claim 1, wherein the metallic membrane is supported by a structure that rests on the support arms of the micro-plate.

12. The bolometric array detector as claimed in claim 1, wherein the openings in the metallic membrane are parallel slits.

13. The bolometric array detector as claimed in claim 1, wherein the openings in the metallic membrane are square or circular.

14. The bolometric array detector as claimed in claim 1, wherein the metallic membrane consists of aluminum, titanium, titanium nitride, copper or tungsten.

15. A bolometric array detector for detecting electromagnetic radiation in a predetermined range of infrared or terahertz wavelengths comprising a substrate and an array of bolometric micro-plates for detecting said radiation, said micro-plates being suspended above the substrate by means of support arms,
wherein said detector comprises a metallic membrane placed on top and around each micro-plate and in which openings are formed;
wherein the openings formed in the metallic membrane are periodically located in said membrane along at least one predetermined axis with a period equal to or less than $$\frac{\lambda}{n},$$

where λ is a wavelength range of the electromagnetic radiation to be detected and n is the average refraction index of a medium that separates each micro-plate from the metallic membrane;
wherein the width of the openings along the, or each, predetermined axis increases from a location on the metallic membrane positioned above a central area of micro-plate towards the periphery of said metallic membrane, and
wherein the width of the openings at said location on the membrane satisfies the equation $$0.25 < \frac{W_0}{P} < 0.75,$$

where $W_0$ is the width at said location and P is the period along the predetermined axis, with the difference in width between two adjacent openings being $$\frac{\lambda}{200 \times n} \text{ to } \frac{\lambda}{20 \times n}.$$

16. A method for manufacturing a bolometric array detector for detecting electromagnetic radiation in a predetermined range of infrared or terahertz wavelengths, said detector comprising an array of micro-plates for detecting said radiation suspended above a substrate by means of support arms and a metallic membrane placed on top and around each microplate and separated therefrom by a medium, said method comprising:
- fabricating the substrate;
- depositing a first sacrificial layer on the substrate;
- fabricating the array of bolometric micro-plates over the first sacrificial layer;
- depositing a second sacrificial layer over the array of micro-plates;
- etching the first and second sacrificial layers down to the substrate in order to expose a cut all the way around each micro-plate;
- depositing a metallic layer over the second sacrificial layer and the cuts around the micro-plates;
- forming openings in a portion of the metallic layer placed on top and around each micro-plate, wherein the openings formed in each of said areas are periodically located along at least one predetermined axis with a period equal to or less than $$\frac{\lambda}{n},$$

where $\lambda$ is a wavelength in the wavelength range of the electromagnetic radiation to be detected and n is the average refraction index of the medium, thereby forming said membranes; and
- removing the first and second sacrificial layers.

17. A method for manufacturing a bolometric array detector for detecting electromagnetic radiation in a predetermined range of infrared or terahertz wavelengths, said detector comprising an array of micro-plates for detecting said radiation suspended above a substrate by means of support arms and a metallic membrane placed on the top and around each microplate and separated therefrom by a medium, said method comprising:
- fabricating the substrate;
- depositing a first sacrificial layer on the substrate;
- fabricating the array of bolometric micro-plates over the first sacrificial layer;
- depositing a second sacrificial layer over the array of micro-plates;
- depositing a layer of supporting material over the second sacrificial layer;
- etching the layer of supporting material and the first and second sacrificial layers down to the substrate in order to expose a cut all the way around each micro-plate;
- depositing a metallic layer over the layer of supporting material and the cuts around the micro-plates;
- forming openings in a portion of the metallic layer placed on top and around each micro-plate, wherein the openings formed in each of said areas are periodically located along at least one predetermined axis with a period equal to or less than $$\frac{\lambda}{n},$$

where $\lambda$ is a wavelength in the wavelength range of the electromagnetic radiation to be detected and n is the average refraction index of the medium, thereby forming said membranes; and
- removing the first and second sacrificial layers.

* * * * *